(12) United States Patent
Ghosh et al.

(10) Patent No.: US 11,354,408 B2
(45) Date of Patent: Jun. 7, 2022

(54) TECHNIQUE FOR DETECTING AND THWARTING ROW-HAMMER ATTACKS

(71) Applicant: NXP USA, Inc., Austin, TX (US)

(72) Inventors: Prokash Ghosh, Mogra (IN); Sourav Roy, Kolkata (IN)

(73) Assignee: NXP USA, Inc., Austin, TX (US)

( * ) Notice: Subject to any disclaimer, the term of this patent is extended or adjusted under 35 U.S.C. 154(b) by 278 days.

(21) Appl. No.: 16/541,456

(22) Filed: Aug. 15, 2019

(65) Prior Publication Data

US 2021/0049269 A1 Feb. 18, 2021

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ............. G06F 21/554; G06F 2221/034; G06F 21/79; G11C 11/406; G11C 11/4087; G11C 11/4085
See application file for complete search history.

(56) References Cited

U.S. PATENT DOCUMENTS

| | | | | |
|---|---|---|---|---|
| 9,032,141 B2* | 5/2015 | Bains | ................ | G11C 11/40611 711/106 |
| 9,747,971 B2 | 8/2017 | Bains et al. | | |
| 9,812,185 B2* | 11/2017 | Fisch | ................ | G11C 11/406 |
| 10,453,503 B2* | 10/2019 | Kilmer | ................ | G06F 13/1668 |
| 11,158,364 B2* | 10/2021 | Penney | ................ | G11C 11/4085 |
| 2014/0095780 A1 | 4/2014 | Bains et al. | | |
| 2015/0058549 A1* | 2/2015 | Jeffrey | ................ | G06F 3/0619 711/106 |
| 2015/0089183 A1 | 3/2015 | Bains et al. | | |
| 2016/0180899 A1 | 6/2016 | Kilmer et al. | | |
| 2019/0066759 A1* | 2/2019 | Nale | ................ | G11C 11/40618 |
| 2020/0090729 A1* | 3/2020 | Son | ................ | G11C 11/4082 |
| 2020/0251158 A1* | 8/2020 | Shore | ................ | G11C 11/407 |
| 2021/0005240 A1* | 1/2021 | Brown | ................ | G11C 15/04 |
| 2021/0012832 A1* | 1/2021 | Devaux | ................ | G06F 13/1668 |

OTHER PUBLICATIONS

Kim et al, "Architecture Support for Mitigating Row Hammering in DRAM Memories", Jan.-Jun. 2015, IEEE Computer Architecture Letters, vol. 14, No. 1, p. 9-12.*

(Continued)

*Primary Examiner* — Christopher A Revak (57) ABSTRACT

A memory controller for a (DRAM) memory processes an (access) command for a target row in the memory, increments a count value for each victim row associated with the target row, and issues a (dummy activate) command for a victim row whose count value reaches a specified threshold. By tracking victim rows instead of target rows, the memory controller can thwart both single-sided and double-sided row-hammer attacks. The memory controller maintains the victim-row addresses and corresponding command counts in a TCAM memory to detect rows that may be prone to row-hammer attacks. If so, then the memory controller issues dummy activate commands to the corresponding memory rows to thwart such row-hammer attacks.

20 Claims, 6 Drawing Sheets

(56) References Cited

OTHER PUBLICATIONS

Daniel Gruss et al. "Another Flip in the Wall of Rowhammer Defenses," 2018 IEEE Symposium on Security and Privacy, May 22-24, 2018, pp. 245-261, DOI: 10.1109/SP.2018.00031, San Francisco, USA.

Victor Van Der Veen et al., "Drammer: Deterministic Rowhammer Attacks on Mobile Platforms," In the proceeding of the ACM SIGSAC Conference on Computer and Comunications Security, Oct. 24-28, 2016, pp. 1675-1689, DOI: 10.1145/2976749.2978406, Vienna, Austria.

* cited by examiner

TECHNIQUE FOR DETECTING AND THWARTING ROW-HAMMER ATTACKS

BACKGROUND

In dynamic random access memory (DRAM) devices, data bits (i.e., 1s and 0s) are stored in individual memory cells that are arranged in rows and columns, where each memory cell stores a voltage representative of either a logical value 1 or a logical value 0. Accessing a row of DRAM can result in small changes to the voltages stored in the memory cells in the two adjacent rows, one row above and one row below the accessed row. When the DRAM is periodically refreshed, the proper voltage levels of all of the memory cells are restored.

It is known that, if a particular row of DRAM is accessed many times between DRAM refresh cycles, then the effects of those accesses on the memory cell voltages can accumulate such that the voltages in some of the memory cells in the two adjacent rows can change enough such that the logical values represented by those memory cells can change from 1s to 0s and/or from 0s to 1s. When such an activity is performed with the intent to generate such bit flips, the activity is referred to as a row-hammer attack. In a row-hammer attack, the row (having row address R) that is accessed is referred to as the target row, and the two adjacent rows (R+1) and (R−1) are referred to as the victim rows. Row-hammer attacks remain a problem for computer security.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two figures shown in succession may in fact be executed substantially concurrently or may sometimes be executed in the reverse order, depending upon the functionality/acts involved. The term "or" is to be interpreted as inclusive unless indicated otherwise.

In an embodiment of the present invention, a method for thwarting row-hammer attacks on memory comprises receiving a command for a target row in the memory, incrementing a count value for each victim row associated with the target row, and issuing a command for a victim row whose count value reaches a specified threshold.

In another embodiment, an article of manufacture comprises a memory and a memory controller for the memory, wherein the memory controller is configured to process a command for a target row in the memory, increment a count value for each victim row associated with the target row, and issue a command for a victim row whose count value reaches a specified threshold.

Whenever an individual DRAM row is activated, either as part of a refresh operation for the entire DRAM memory or during a routine memory operation on only that individual DRAM row, as long as the voltage levels stored in that row's memory cells have not deviated sufficiently from their desired levels, the voltage levels of those memory cells will be restored to their proper levels, thereby preserving the integrity of the logical values stored in that DRAM row. Activation of a DRAM row is said to re-energize that row.

If there is an ongoing row-hammer attack in which a particular DRAM row is an intended victim row of that attack, but the victim row is re-energized, either as part of a DRAM refresh operation or as a result of activating only that individual row, before any of the memory cell voltage levels have deviated sufficiently from their desired levels to correspond to bit flips, then the cumulative effects of the row-hammer attack up to that instant will be erased. If the row-hammer attack continues, then it will be as if the row-hammer attack had just started. As long as the victim rows are reenergized sufficiently frequently, the row-hammer attack will be successfully thwarted.

Figure 1:
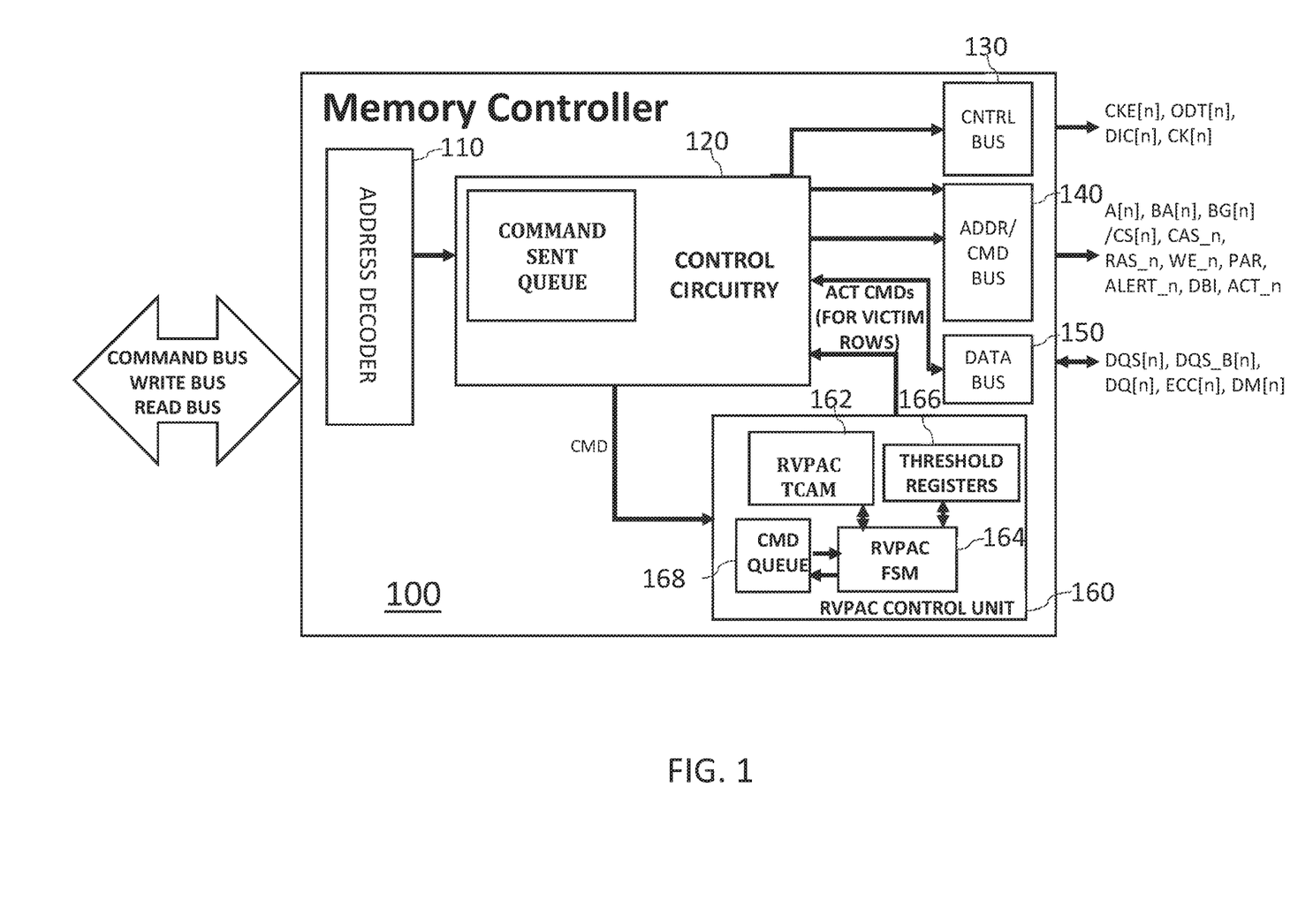
FIG. 1 is a simplified block diagram of a memory controller for DRAM memory, according to one embodiment of the invention.

FIG. 1 is a simplified block diagram of a memory controller 100 for DRAM memory (not shown in FIG. 1), according to one embodiment of the invention. In addition to conventional components of prior-art memory controllers, such as the address decoder 110, the control circuitry 120, the control bus 130, the ADDR/CMD bus 140, and the data bus 150, the memory controller 100 also includes a row-hammer victim page address cache (RVPAC) control unit 160. In turn, the RVPAC control unit 160 includes an RVPAC memory 162, an RVPAC finite state machine (FSM) 164, threshold registers 166, and a command queue 168.

In one possible implementation, the RVPAC memory 162 is a ternary content-addressable memory (TCAM) device having 64 35-bit entries, where each 35-bit entry contains the concatenation of an 18-bit DRAM row address, a 16-bit counter value, and a 1-bit validity flag. Other implementations may have different numbers of entries, different numbers of bits for the DRAM row addresses, and/or different numbers of bits for the counter values. In one possible implementation, one instance of the RVPAC control unit 160 might be used to thwart row-hammer attacks in all rows of a bank of DRAM memory.

Figure 2:
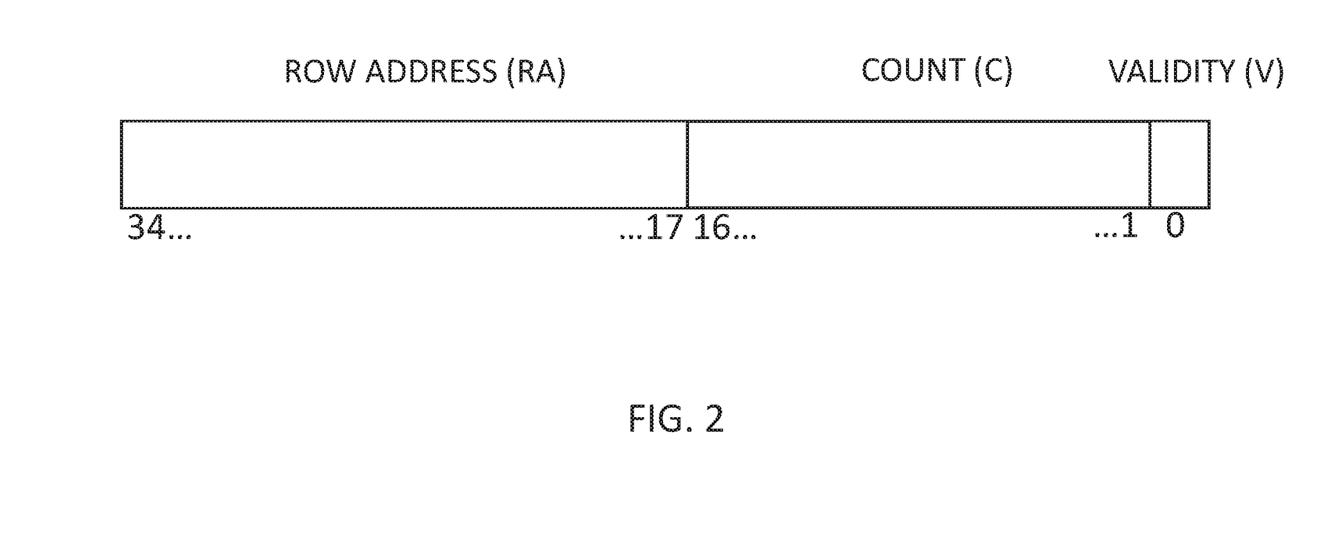
FIG. 2 is a representation of each 35-bit entry ENTRY [34:0] in the RVPAC TCAM of FIG. 1, according to one embodiment of the present invention.

FIG. 2 is a representation of each 35-bit entry ENTRY [34:0] in the RVPAC TCAM 162 of FIG. 1, in which:
ENTRY[34:17] is the 18-bit DRAM row address;
ENTRY[16:1] is the 16-bit counter value; and
ENTRY[0] is the 1-bit validity flag.

As described further below, the RVPAC FSM 164 controls the generation and writing of data to and the reading and processing of data from the RVPAC TCAM 162. The threshold registers 166 store various threshold values for the FSM 164, and the command queue 168 stores incoming commands fetched from the COMMAND SENT QUEUE of the control circuitry 120.

Figure 3:
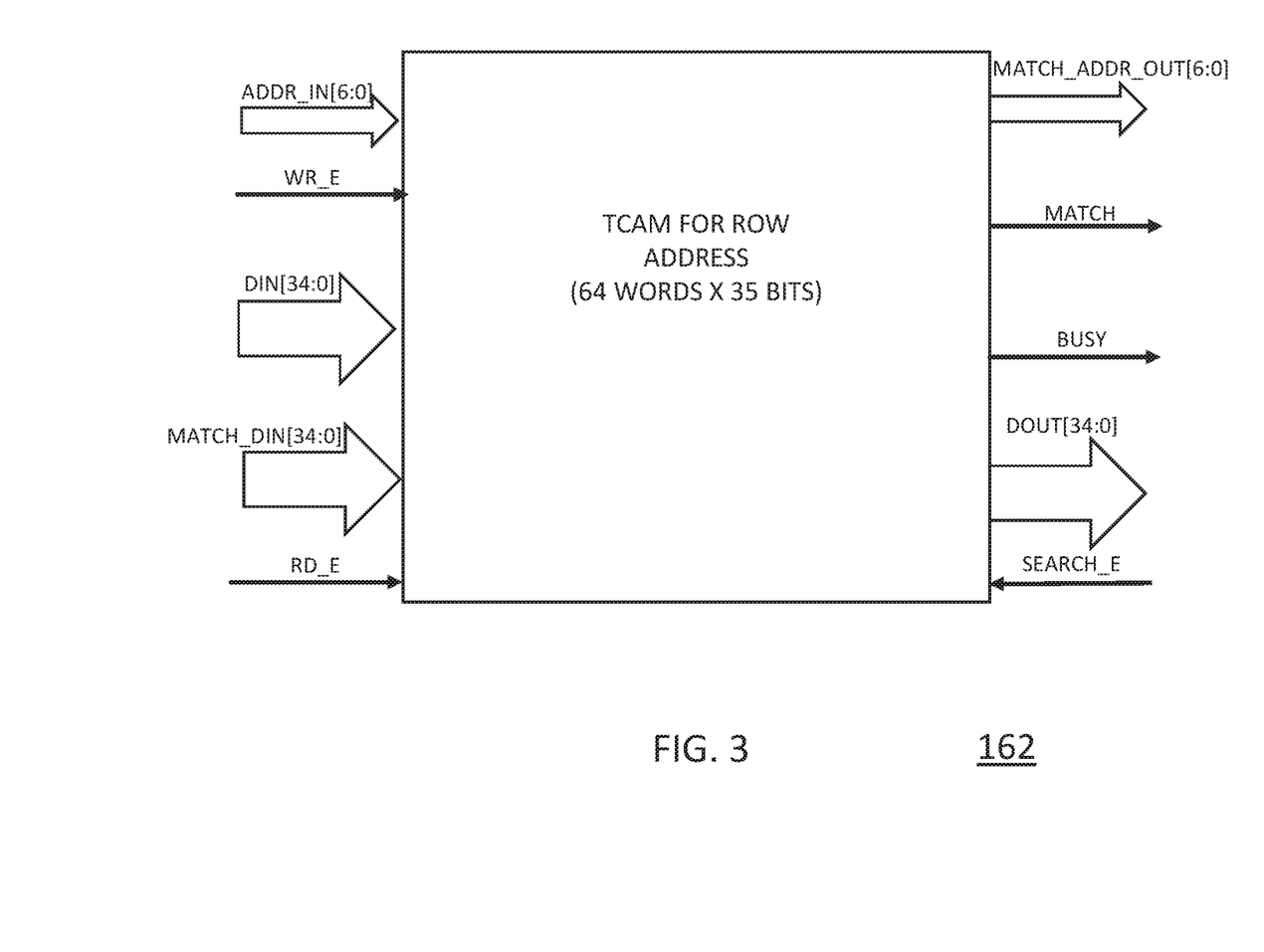
FIG. 3 is a diagram of the RVPAC TCAM of FIG. 1, according to one embodiment of the present invention.

FIG. 3 is a diagram of the RVPAC TCAM 162 of FIG. 1. As shown in FIG. 3, the RVPAC TCAM 162 is configured to (i) receive a 7-bit input address signal ADDR_IN[6:0], a 1-bit write enable signal WR_E, a 35-bit input data signal DIN[34:0], and a 1-bit read enable signal RD_E and (ii) provide a 35-bit output data signal DOUT[34:0] and a 1-bit busy signal BUSY. These signals can be used to support write and read operations similar to those of static random access memory (SRAM) devices.

As understood by those skilled in the art, in addition to conventional write and read operations, the contents of a TCAM device can be searched using any portion of an entry value. To support those searches, the TCAM 162 is configured to (i) receive a 35-bit data-match input signal MATCH_DIN[34:0] and a 1-bit search-control signal SEARCH_E and (ii) provide a 7-bit data-match address signal MATCH_ADDR_OUT[6:0] and a 1-bit data-match flag signal MATCH.

The data-match input signal MATCH_DIN can have any one or more of its 35 bits specified with 1s or 0s with the remaining bits, if any, left unspecified. When the search control signal SEARCH_E is asserted, if any one or more of the 64 entries in the TCAM 162 have corresponding bit values that match the one or more specified bits in MATCH_DIN, then the match flag signal MATCH will be asserted and the one or more TCAM row addresses of those one or more entries will be serially output using the data-match address signal MATCH_ADDR_OUT.

As described further below, the entries stored in the RVPAC TCAM 162 correspond to the victim rows of possible row-hammer attacks, where each entry identifies the 18-bit row address of a victim row, a 16-bit counter value tracking the total number of access commands for any target row associated with the victim row, and a 1-bit validity flag indicating whether the entry is valid or invalid.

As mentioned previously, a target row (R) has two victim rows (R−1) and (R+1). Note that, if row (R−2) is also a target row, then row (R−1) is also a victim row of target row (R−2) and that, if row (R+2) is also a target row, then row (R+1) is also a victim row of target row (R+2). Thus, each target row is associated with two adjacent victim rows, and each victim row may be associated with two adjacent target rows. Of course, these statements do not strictly apply to the first row and the last row in DRAM memory, since there are no rows above the first row or below the last row.

Figure 4:
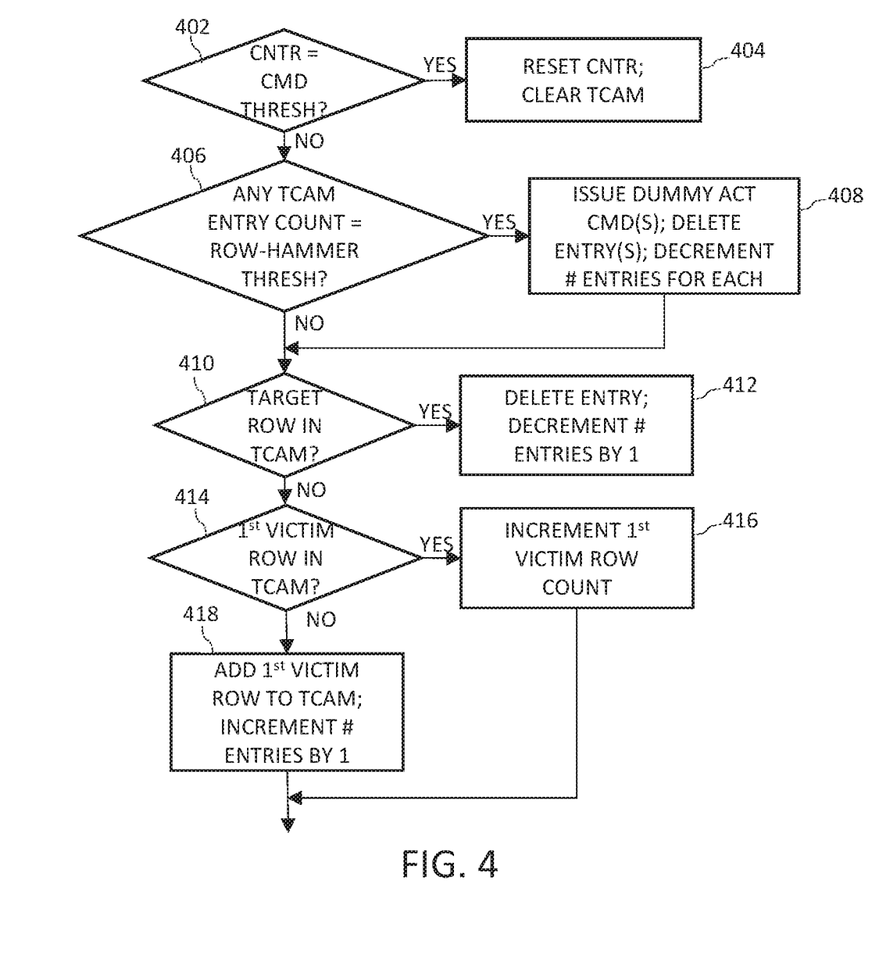
FIG. 4 is a flow diagram representing the processing performed by the RVPAC FSM of FIG. 1, according to one embodiment of the invention.

FIG. 4 is a flow diagram representing the processing performed by the RVPAC FSM 164 of FIG. 1, according to one embodiment of the invention. Whenever the control circuitry 120 of FIG. 1 generates an access command for a row of the DRAM memory, the control circuitry 120 provides that access command to the RVPAC control unit 160, and the RVPAC FSM 164 implements the processing of FIG. 4 one time. The FSM 164 keeps a running counter CNTR to count the refresh interval time. The refresh interval counter CNTR is reset to zero at device reset, upon reaching the specified refresh interval time threshold, or on detection of any auto refresh command which might be issued by the memory controller 100 for any bank or set of banks/ranks of memory. The FSM 164 also keeps track of the number of valid entries currently stored in the RVPAC TCAM 162.

In step 402, the FSM 164 compares the refresh interval counter CNTR to a specified threshold value THRESH stored in the threshold registers 166 of FIG. 1. The threshold value THRESH corresponds to the refresh interval for the DRAM memory. For example, an auto refresh command should be issued by the memory controller 100 to the banks of DRAM memory within THRESH. As another example, in one implementation, THRESH can contain a counter value equivalent to a refresh interval of 64 milliseconds (ms) for standard DRAMs. If CNTR has not yet reached THRESH, then processing continues to step 406. If CNTR reaches to THRESH, DRAM is due to be refreshed. In that case, in step 404, the counter CNTR is reset to zero. The FSM 164 clears the TCAM 162 whenever CNTR goes to zero. Note that the TCAM 162 can be cleared by setting all of the entries' validity bits to 0. After executing step 404, the processing of FIG. 4 is completed. Note that, even if the current access command is part of a bona fide row-hammer attack, the processing of FIG. 4 will start to track that row-hammer attack at the next access command of that attack.

In step 406, the FSM 164 determines whether any one or more of the valid entries in the TCAM 162 have a 16-bit count value that has reached a specified 16-bit row-hammer count threshold ROW_HAMMER_THRESH stored in the threshold registers 166. To perform that search, the FSM 164 executes a ternary search of the TCAM 162 using a 35-bit value for MATCH_DIN that has the 16-bit count field set to ROW_HAMMER_THRESH, the 1-bit validity flag set to 1, and the 18-bit address field unspecified. If there are no matches, then the TCAM 162 will not assert the TCAM MATCH signal of FIG. 3, the FSM 164 determines that no valid entries have reached the row-hammer count threshold, and processing proceeds to step 410. If there are one or more matches, then the TCAM 162 will assert the TCAM MATCH signal and serially provide the one or more TCAM addresses of those entries in MATCH_ADDR_OUT of FIG. 3. As such, the FSM 164 determines that the one or more DRAM victim rows associated with those one or more TCAM entries could be the candidates of row-hammer attacks. As such, in step 408, the FSM 164 issues a dummy activate (ACT) command to each of those one or more DRAM victim rows. A dummy ACT command will re-energize the corresponding DRAM victim row, thereby thwarting a row-hammer attack of that DRAM row. In alternative implementations, suitable commands that re-energize memory rows, other than dummy ACT commands, such as a read command, a write command, or a pre-charge command, may be used. Since the victim rows have been re-energized, the FSM 164 deletes those entries from the TCAM 162 and decrements the number of valid entries in the TCAM 162 by the number of deleted entries. Note that, even if one or more of those DRAM rows were the intended victims of an on-going row-hammer attack, the monitoring of that attack will resume with the attack's next access command. After the execution of step 408, processing proceeds to step 410.

In step 410, the FSM 164 determines whether the DRAM row associated with the current access command is represented by a valid entry in the TCAM 162. To perform that search, the FSM 164 executes a ternary search of the TCAM 162 using a 35-bit value for MATCH_DIN that has the 18-bit address field set to the DRAM row address, the 1-bit validity flag set to 1, and the 16-bit count field unspecified. If such a valid entry does not exist, then the TCAM 162 will determine that the DRAM row associated with the current access command is not represented by a valid entry in the TCAM 162 and processing will proceed to step 414.

If such a valid entry exists, then, in response to step 410, the TCAM 162 will assert the TCAM MATCH flag and provide the TCAM address of that entry as MATCH_ADDR_OUT. Note that the conventional control circuitry 120 of FIG. 1 will apply the access command to the actual DRAM row, which will result in that DRAM row being re-energized. As such, even if that DRAM row were the intended victim of a row-hammer attack, the (likely innocent) access command for that row will have the fortuitous effect of thwarting that attack. As such, in step 412, the FSM 164 deletes that entry and decrements the number of valid entries in the TCAM 162. After the execution of step 412, processing proceeds to step 414. Note that, even if such a DRAM row were the intended victim of an on-going row-hammer attack, the monitoring of that attack will resume with the attack's next access command.

Whether or not the FSM 164 determines in step 410 that the TCAM 162 does not contain a valid entry associated with the DRAM row of the current access command, that access command could be part of a row-hammer attack of one or both of the DRAM rows adjacent to that DRAM row. In that case, the DRAM row (R) of the current access command would be a target row of that row-hammer attack, and the adjacent rows (R+1) and (R−1) would be first and second possible victim rows of that row-hammer attack.

In step 414, the FSM 164 determines whether the TCAM 162 contains a valid entry associated with the first possible victim row (R+1). To perform that search, the FSM 164 executes a ternary search of the TCAM 162 using a 35-bit value for MATCH_DIN that has the 18-bit address field set to the row address (R+1), the 1-bit validity flag set to 1, and the 16-bit count field unspecified. If the TCAM 162 contains a valid entry associated with the first possible victim row (R+1), then the TCAM 162 will assert the MATCH flag and provide the TCAM address of that entry as MATCH_ADDR_OUT. In that case, in step 416, the FSM 164 will increment the 16-bit count field of that entry by 1 and processing proceeds to step 420.

If the TCAM 162 does not contain a valid entry associated with the first victim row (R+1), then the TCAM 162 will not assert the MATCH flag in step 414 and processing proceeds to step 418. In step 418, the FSM 164 creates a new valid entry in the TCAM 162 for the first possible victim row (R+1) and increments the number of valid entries in the TCAM 162 by 1. Processing then proceeds to step 420.

In step 420, the FSM 164 determines whether the TCAM 162 is almost full, i.e., whether the TCAM 162 contains 63 valid entries out of a maximum possible 64 entries. If not, then processing proceeds to step 424. If the TCAM 162 is almost full, then, in step 422, the FSM 164 selects one of the 63 valid entries, issues a dummy ACT command for the DRAM row associated with that selected entry, invalidates that selected entry in the TCAM 162, and decrements the number of valid entries in the TCAM 162 by 1. The processing performed to select the entry to be invalidated is described further below. Note that, if the selected entry were the intended victim of a row-hammer attack, then the dummy ACT command will thwart that attack and, if the attack is on-going, the FSM 164 will resume monitoring that attack at the attack's next access command. After the execution of step 422, processing proceeds to step 424.

In step 424, the FSM 164 determines whether the TCAM 162 contains a valid entry associated with the second possible victim row (R−1). To perform that search, the FSM 164 executes a ternary search of the TCAM 162 using a 35-bit value for MATCH_DIN that has the 18-bit address field set to the row address (R−1), the 1-bit validity flag set to 1, and the 16-bit count field unspecified. If the TCAM 162 contains a valid entry associated with the second victim row (R−1), then the TCAM 162 will assert the MATCH flag and provide the TCAM address of that entry as MATCH_ADDR_OUT. In that case, in step 426, the FSM 164 will increment the 16-bit count field of that entry by 1 and processing will proceed to step 430.

If the TCAM 162 does not contain a valid entry associated with the second victim row (R−1), then the TCAM 162 will not assert the MATCH flag in step 424 and processing proceeds to step 428. In step 428, the FSM 164 creates a new valid entry in the TCAM 162 for the second possible victim row (R−1) and increments the number of valid entries in the TCAM 162 by 1. Processing then proceeds to step 430.

Note that, if the target row (R) is either the first row or the last row in the DRAM memory, then that target row will have only one possible victim row to be handled by the processing of FIG. 4. In particular, if the target row (R) is the last DRAM row, then steps 414-418 are omitted. Similarly, if the target row (R) is the first DRAM row, then steps 424-428 are omitted.

As described above, the FSM 164 keeps track of the total number of valid entries in the TCAM 162 by incrementing a corresponding counter every time a new valid entry is added to the TCAM 162 and decrementing that counter every time an existing valid entry is removed (i.e., invalidated). The following processing ensures that the TCAM 162 has enough room to begin to track a new row-hammer attack the next time the processing of FIG. 4 is executed. Since a new row-hammer attack has one or two victim rows that may need to be added to the TCAM 162, the following processing ensures that there will be no more than 62 valid entries stored in the 64-row TCAM 162 at the end of each execution of the processing of FIG. 4.

In step 430, the FSM 164 determines whether the TCAM 162 is completely full, i.e., whether the TCAM 162 contains 64 valid entries out of a maximum possible 64 entries. If not, then processing proceeds to step 434. If the TCAM 162 is completely full, then, in step 432, the FSM 164 selects two of the 64 valid entries, issues dummy ACT commands for the two DRAM rows associated with those two selected entries, invalidates those two selected entries in the TCAM 162, and decrements the number of valid entries in the TCAM 162 by 2. The processing performed to select those two entries is described further below. Note that, if one or both of the two selected entries were the intended victims of row-hammer attacks, the dummy ACT commands will thwart those attack and, if either or both attacks are on-going, then the FSM 164 will resume monitoring those attacks at the attack's next access command. After the execution of step 432, processing proceeds to step 434.

In step 434, the FSM 164 increments the refresh interval counter CNTR appropriately.

Figure 5:
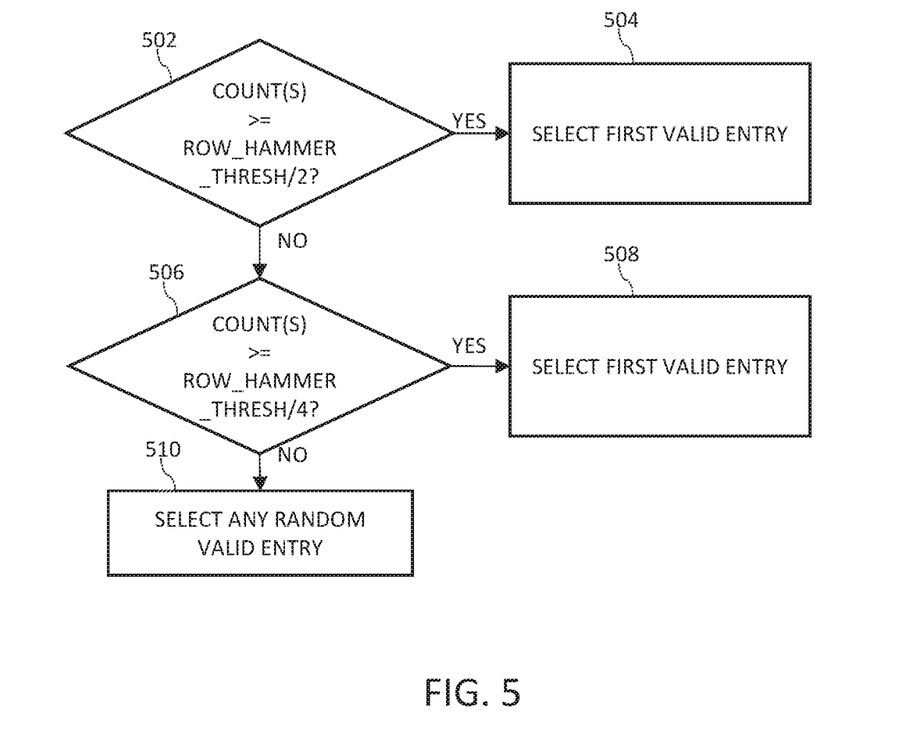
FIG. 5 is a flow diagram of the processing performed by the FSM of FIG. 1 to select each valid entry to delete from the TCAM of FIG. 1, according to one embodiment of the present invention.

FIG. 5 is a flow diagram of the processing performed by the FSM 164 of FIG. 1 in steps 428 and 432 of FIG. 4, to select each valid entry to delete from the TCAM 162, according to one embodiment of the present invention. For step 428, the FSM 164 executes the processing of FIG. 5 once. For step 432, the FSM 164 executes the processing of FIG. 5 twice.

Note that efficient implementation of the processing of FIG. 4 involves the use of an appropriate value for the row-hammer count threshold ROW_HAMMER_THRESH. The row-hammer threshold value is stored in the ROW_HAMMER_THRESH register inside the threshold registers 166 of FIG. 1. For example, in one possible implementation, ROW_HAMMER_THRESH is equal to the hexadecimal value 16'hFFFF, which is equivalent to the 16-bit value [1111 1111 1111 1111]. In that case, one half of the count threshold will be (about) 16'h8000, which is equivalent to the 16-bit value [1000 0000 0000 0000], and one quarter of the count threshold will be (about) 16'h4000, which is equivalent to the 16-bit value [0100 0000 0000 0000].

In step 502, the FSM 164 searches the RVPAC TCAM 162 for any entries having count values with a magnitude of at least about a half of the count threshold. To perform that search, the FSM 164 executes a ternary search of the TCAM 162 using a 35-bit value for MATCH_DIN that has the 16-bit count field set based on a value equal to about a half of the count threshold or [1xxx xxxx xxxx xxxx], where "x" is an unspecified bit, the 1-bit validity flag set to 1, and the 18-bit address field unspecified. Because of those unspecified bits in the 16-bit count field, such a search will identify all valid entries having a count value of 16'h8000 or higher. If the TCAM 162 contains one or more of such entries, then the TCAM 162 will assert the MATCH flag and provide the TCAM addresses of those one or more entries as MATCH_ADDR_OUT and processing will proceed to step 504. In one possible implementation, in step 504, the FSM 164 selects the first such entry and the processing of FIG. 5 ends. In other implementations, the FSM 164 can select any one of those entries. If the search in step 502 fails, then processing continues to step 506.

In step 506, the FSM 164 searches the RVPAC TCAM 162 for any entries having count values with a magnitude of at least about a quarter of the count threshold. To perform that search, the FSM 164 executes a ternary search of the TCAM 162 using a 35-bit value for MATCH_DIN that has the 16-bit count field set based on a value equal to about a quarter of the count threshold or [01xx xxxx xxxx xxxx], where "x" is an unspecified bit, the 1-bit validity flag set to 1, and the 18-bit address field unspecified. Because of those unspecified bits in the 16-bit count field, such a search will identify all valid entries having a count value of 16'h4000 or higher. If the TCAM 162 contains one or more of such entries, then the TCAM 162 will assert the MATCH flag and provide the TCAM addresses of those one or more entries as MATCH_ADDR_OUT and processing will proceed to step 508. In one possible implementation, in step 508, the FSM 164 selects the first such entry and the processing of FIG. 5 ends. In other implementations, the FSM 164 can select any one of those entries. If the search in step 506 fails, then processing continues to step 510.

In step 510, the FSM 164 randomly selects any valid entry in the TCAM 162. To perform this search, the FSM 164 executes a ternary search of the TCAM 162 using a 35-bit value for MATCH_DIN that has the 1-bit validity flag set to 1 and all the other bits unspecified. In response, the TCAM 162 will assert the MATCH flag and serially provide the TCAM addresses of the valid entries as MATCH_ADDR_OUT. In one possible implementation, the FSM 164 selects the first valid entry. In alternative implementations, the FSM 164 can select any one of the other valid entries.

By implementing the processing of FIG. 5, the FSM 164 will select a valid entry having a count value of at least a half of the row-hammer count threshold if any exist. Otherwise, the FSM 164 will select a valid entry having a count value of at least a quarter of the row-hammer count threshold if any exist. Otherwise, the FSM 164 select a valid entry having a row-hammer count value of less than a quarter of the count threshold. In this way, to make room for up to two new victim rows of a possible row-hammer attack, the FSM 164 will select a valid entry having a relatively high row-hammer count value for deletion from the TCAM 162. Since the FSM 164 issues a dummy ACT command for that deleted entry in step 422 or step 432 of FIG. 4, if that selected entry corresponds to a bona fide DRAM victim row, then that row-hammer attack will be thwarted.

By tracking the victim rows instead of the target rows, the FSM 164 is able to detect and thwart both single-sided row-hammer attacks and double-sided row-hammer attacks in which access commands are applied to the two rows on either side of the intended victim row. Note that the present invention may be implemented for legacy as well as future DRAM memories without requiring any change in the design of the memories.

In a preferred implementation, all of the processing performed by the RVPAC control unit 160 of FIG. 1 is implemented in hardware. As such, that processing will not be susceptible to computer hacking that targets software.

Although the invention has been described in the context of row-hammer attacks of any type of DRAM memory, the invention can also be used to detect and thwart row-hammer attacks of other types of memory devices.

Although the invention has been described in the context of the processing of FIG. 4, in other implementations, the steps in FIG. 4 can be implemented in different sequences. For example, the processing of steps 414-418 can be implemented after (or even in parallel with) the processing of steps 424-428. As another example, the processing of steps 420-422 can be implemented before the processing of steps 414-418. Those skilled in the art will understand that other steps and subsets of steps can also be implemented in different sequences.

Although the RVPAC cache 162 has been described as being implemented using a TCAM device, other suitable types of memory devices may be used in alternative implementations.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for thwarting row-hammer attacks on memory, the method comprising:
   receiving a command for a target row in the memory;
   incrementing a count value for each victim row associated with the target row; and
   issuing a command for a victim row whose count value reaches a specified threshold.

2. The method of claim 1, wherein:
   the command for the target row is an access command; and
   the command for the victim row is a dummy activate command.

3. The method of claim 1, wherein the count value for each victim row is stored in a ternary content-addressable memory (TCAM) along with the victim row's address.

4. The method of claim 3, wherein, when the TCAM has a valid entry for the target row, the valid entry is deleted from the TCAM.

5. The method of claim 3, wherein, when the TCAM does not have an existing valid entry for a victim row, a new valid entry for the victim row is added to the TCAM.

6. The method of claim 3, wherein, when the TCAM has room for at most one additional valid entry, at least one valid entry is deleted from the TCAM and a dummy activate command is issued for the memory row corresponding to the deleted valid entry.

7. The method of claim 6, wherein:
   when the TCAM has one or more valid entries having a count value of at least a half of the specified threshold, one of those one or more valid entries is selected to be deleted;
   otherwise, when the TCAM has one or more valid entries having a count value of at least a quarter of the specified threshold, one of those one or more valid entries is selected to be deleted; and
   otherwise, one of the valid entries is selected to be deleted.

8. The method of claim 6, wherein:
   a valid-entry counter is maintained to keep track of the number of valid entries in the TCAM;
   when the valid-entry counter is one less than the size of the TCAM, a single valid entry is deleted from the TCAM; and
   when the valid-entry counter is equal to the size of the TCAM, two valid entries are deleted from the TCAM.

9. The method of claim 3, wherein:
   a refresh interval counter is maintained to keep track of the refresh interval; and
   when the refresh interval counter is equal to a specified threshold or when any auto refresh command is detected for the memory, the TCAM is cleared and the refresh interval counter is reset.

10. The method of claim 1, wherein the memory is a DRAM memory.

11. An article of manufacture comprising a memory and a memory controller for the memory, wherein the memory controller is configured to:
    process a command for a target row in the memory;
    increment a count value for each victim row associated with the target row; and
    issue a command for a victim row whose count value reaches a specified threshold.

12. The article of claim 11, wherein:
    the command for the target row is an access command; and
    the command for the victim row is a dummy activate command.

13. The article of claim 11, wherein the memory controller comprises a TCAM that stores the count value for each victim row along with the victim row's address.

14. The article of claim 13, wherein, when the memory controller determines that the TCAM has a valid entry for the target row, the memory controller deletes the valid entry from the TCAM.

15. The article of claim 13, wherein, when the memory controller determines that the TCAM does not have an existing valid entry for a victim row, the memory controller adds a new valid entry for the victim row to the TCAM.

16. The article of claim 13, wherein, when the memory controller determines that the TCAM has room for at most one additional valid entry, the memory controller deletes at least one valid entry from the TCAM and issues a dummy activate command for the memory row corresponding to the deleted valid entry.

17. The article of claim 16, wherein:
    when the memory controller determines that the TCAM has one or more valid entries having a count value of at least a half of the specified threshold, the memory controller selects one of those one or more valid entries to be deleted;
    otherwise, when the memory controller determines that the TCAM has one or more valid entries having a count value of at least a quarter of the specified threshold, the memory controller selects one of those one or more valid entries to be deleted; and
    otherwise, the memory controller selects one of the valid entries to be deleted.

18. The article of claim 16, wherein:
    the memory controller is configured to maintain a valid-entry counter to keep track of the number of valid entries in the TCAM;

when the memory controller determines that the valid-entry counter is one less than the size of the TCAM, the memory controller deletes a single valid entry from the TCAM; and when the memory controller determines that the valid-entry counter is equal to the size of the TCAM, the memory controller deletes two valid entries from the TCAM.

19. The article of claim 13, wherein:

the memory controller maintains a refresh interval counter to keep track of the refresh interval; and when the memory controller determines that the refresh interval counter is equal to a specified threshold or when any auto refresh command is detected for the memory, the memory controller clears the TCAM and resets the refresh interval counter.

20. The article of claim 11, wherein the memory is a DRAM memory.

* * * * *